(12) United States Patent
Smith

(10) Patent No.: US 12,069,974 B2
(45) Date of Patent: Aug. 27, 2024

(54) AGRICULTURAL VEHICLE WITH SATELLITE AND VARIABLE WHEEL SPEED TURN CONTROL

(71) Applicant: CNH Industrial America LLC, New Holland, PA (US)

(72) Inventor: Kevin Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 211 days.

(21) Appl. No.: 17/843,773

(22) Filed: Jun. 17, 2022

(65) Prior Publication Data

US 2023/0403966 A1    Dec. 21, 2023

(51) Int. Cl.
  *A01B 69/04*    (2006.01)
  *G05D 1/00*    (2006.01)

(52) U.S. Cl.
  CPC ......... *A01B 69/008* (2013.01); *G05D 1/0278* (2013.01)

(58) Field of Classification Search
  CPC .............................. A01B 69/008; G05D 1/0278
  See application file for complete search history.

(56) References Cited

U.S. PATENT DOCUMENTS

| 10,352,829 | B2 | 7/2019 | Ren et al. | |
| 10,524,406 | B2 | 1/2020 | Potier et al. | |
| 2006/0174599 | A1* | 8/2006 | Hironimus | A01D 75/303 56/6 |
| 2018/0035606 | A1* | 2/2018 | Burdoucci | A01G 3/085 |
| 2018/0373257 | A1 | 12/2018 | Runde et al. | |
| 2019/0313567 | A1 | 10/2019 | Tanaka | |
| 2020/0029490 | A1 | 1/2020 | Bertucci et al. | |
| 2023/0039718 | A1* | 2/2023 | Suleman | A01B 69/008 |

FOREIGN PATENT DOCUMENTS

CN        109782771 A    5/2019

* cited by examiner

*Primary Examiner* — Ramsey Refai
(74) *Attorney, Agent, or Firm* — Peter K. Zacharias; Rickard K. DeMille; Rebecca L. Henkel

(57) ABSTRACT

A steering system includes a controller. The controller is configured to: enter a turn mode; determine respective, different rotation speeds of steerable wheels to turn the vehicle and reach a defined second position from a first position; output respective rotation speed signals to drivers to rotate the respective wheels at the determined respective rotation speeds in the turn mode; and determine the vehicle has reached the defined second position based at least partially on the rotation speeds and responsively exit the turn mode.

20 Claims, 4 Drawing Sheets

AGRICULTURAL VEHICLE WITH SATELLITE AND VARIABLE WHEEL SPEED TURN CONTROL

FIELD OF THE INVENTION

The present disclosure pertains to an agricultural vehicle and, more specifically, to an agricultural vehicle with a steering system.

BACKGROUND OF THE INVENTION

An agricultural vehicle known as a "windrower" is used to cut and place crop material into a windrow for subsequent harvesting or baling by another agricultural machine in a secondary operation. A windrower can be self-propelled and may include a chassis, wheels supporting the chassis, a prime mover, a cab, and a detachable header such as a sicklebar header or a draper header for cutting and placing the crop material on the field in the windrow. Some of the crops processed by windrowers include hay, forage, and other small-grain crops.

Increasingly, agricultural vehicles, including windrowers, are operating at least semi-autonomously where a controller of the vehicle controls steering of the agricultural vehicle during at least some of the vehicle's operation. Many controllers utilize global positioning satellite (GPS) to determine the location of the vehicle in a field and control movement of the vehicle accordingly. One particular issue that arises with relying on GPS to control movement of the vehicle is that GPS positioning is relatively insensitive and may not be accurate when the vehicle moves only a small distance. In such instances, the GPS positioning system may be unable to accurately detect that the vehicle has moved.

What is needed in the art is a way to accurately control movement of a vehicle by a controller.

SUMMARY OF THE INVENTION

Exemplary embodiments provided according to the present disclosure provide a controller that is configured to determine a vehicle has reached a defined second position from a first position while turning based at least partially on different rotation speeds of opposite steerable wheels.

In some exemplary embodiments provided according to the present disclosure, a steering system for a vehicle includes: at least one first steerable wheel; a first driver coupled to the at least one first steerable wheel and configured to drive the at least one first steerable wheel at variable rotation speeds; at least one second steerable wheel opposite the at least one first steerable wheel; a second driver coupled to the at least one second steerable wheel and configured to drive the at least one second steerable wheel at variable rotation speeds; and a controller operably coupled to the first driver and the second driver and configured to: enter a turn mode; determine a first rotation speed of the at least one first steerable wheel and a second rotation speed of the at least one second steerable wheel to turn the vehicle and reach a defined second position from a first position, the second rotation speed being different than the first rotation speed; output a first rotation speed signal to the first driver to rotate the at least one first steerable wheel at the first rotation speed and a second rotation speed signal to the second driver to rotate the at least one second steerable wheel at the second rotation speed in the turn mode; and determine the vehicle has reached the defined second position based at least partially on the first rotation speed and the second rotation speed and responsively exit the turn mode.

In some exemplary embodiments provided according to the present disclosure, an agricultural vehicle includes: a chassis; a header carried by the chassis and including a cutting mechanism; and a steering system carried by the chassis. The steering system includes: at least one first steerable wheel; a first driver coupled to the at least one first steerable wheel and configured to drive the at least one first steerable wheel at variable rotation speeds; at least one second steerable wheel opposite the at least one first steerable wheel; a second driver coupled to the at least one second steerable wheel and configured to drive the at least one second steerable wheel at variable rotation speeds; and a controller operably coupled to the first driver and the second driver and configured to: enter a turn mode; determine a first rotation speed of the at least one first steerable wheel and a second rotation speed of the at least one second steerable wheel to turn the agricultural vehicle and reach a defined second position from a first position, the second rotation speed being different than the first rotation speed; output a first rotation speed signal to the first driver to rotate the at least one first steerable wheel at the first rotation speed and a second rotation speed signal to the second driver to rotate the at least one second steerable wheel at the second rotation speed in the turn mode; and determine the agricultural vehicle has reached the defined second position based at least partially on the first rotation speed and the second rotation speed and responsively exit the turn mode.

In some exemplary embodiments provided according to the present disclosure, a method for steering a vehicle is provided. The vehicle includes at least one first steerable wheel, a first driver coupled to the at least one first steerable wheel, at least one second steerable wheel opposite the at least one first steerable wheel, a second driver coupled to the at least one second steerable wheel, and a controller coupled to the first driver and the second driver. The method is performed by the controller and includes: entering a turn mode; determining a first rotation speed of the at least one first steerable wheel and a second rotation speed of the at least one second steerable wheel to turn the vehicle and reach a defined second position from a first position, the second rotation speed being different than the first rotation speed; outputting a first rotation speed signal to the first driver to rotate the at least one first steerable wheel at the first rotation speed and a second rotation speed signal to the second driver to rotate the at least one second steerable wheel at the second rotation speed in the turn mode; and determining the vehicle has reached the defined second position based at least partially on the first rotation speed and the second rotation speed and responsively exiting the turn mode A possible advantage that may be realized by exemplary embodiments provided according to the present disclosure is that the controller determines the vehicle has turned and reached the defined second position based on the first rotation speed and the second rotation speed, which eliminates inaccuracy that may be associated with relying on GPS positioning.

Another possible advantage that may be realized by exemplary embodiments provided according to the present disclosure is that the controller can determine a heading of the vehicle after reaching the defined second position, which is difficult to determine when relying on GPS.

Yet another possible advantage that may be realized by exemplary embodiments provided according to the present disclosure is that the controller can be configured to control the rotation speeds of the first steerable wheel(s) and the second steerable wheel(s) so the vehicle only turns within a boundary region, such as headlands of a field, to avoid damaging, for example, standing crops that have not yet been cut.

BRIEF DESCRIPTION OF THE DRAWINGS

For the purpose of illustration, there are shown in the drawings certain embodiments of the present disclosure. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the vehicle, but they should not be construed as limiting. The terms "longitudinal" and "transverse" are determined with reference to the fore-and-aft direction of the agricultural vehicle and are equally not to be construed as limiting.

Figure 1:
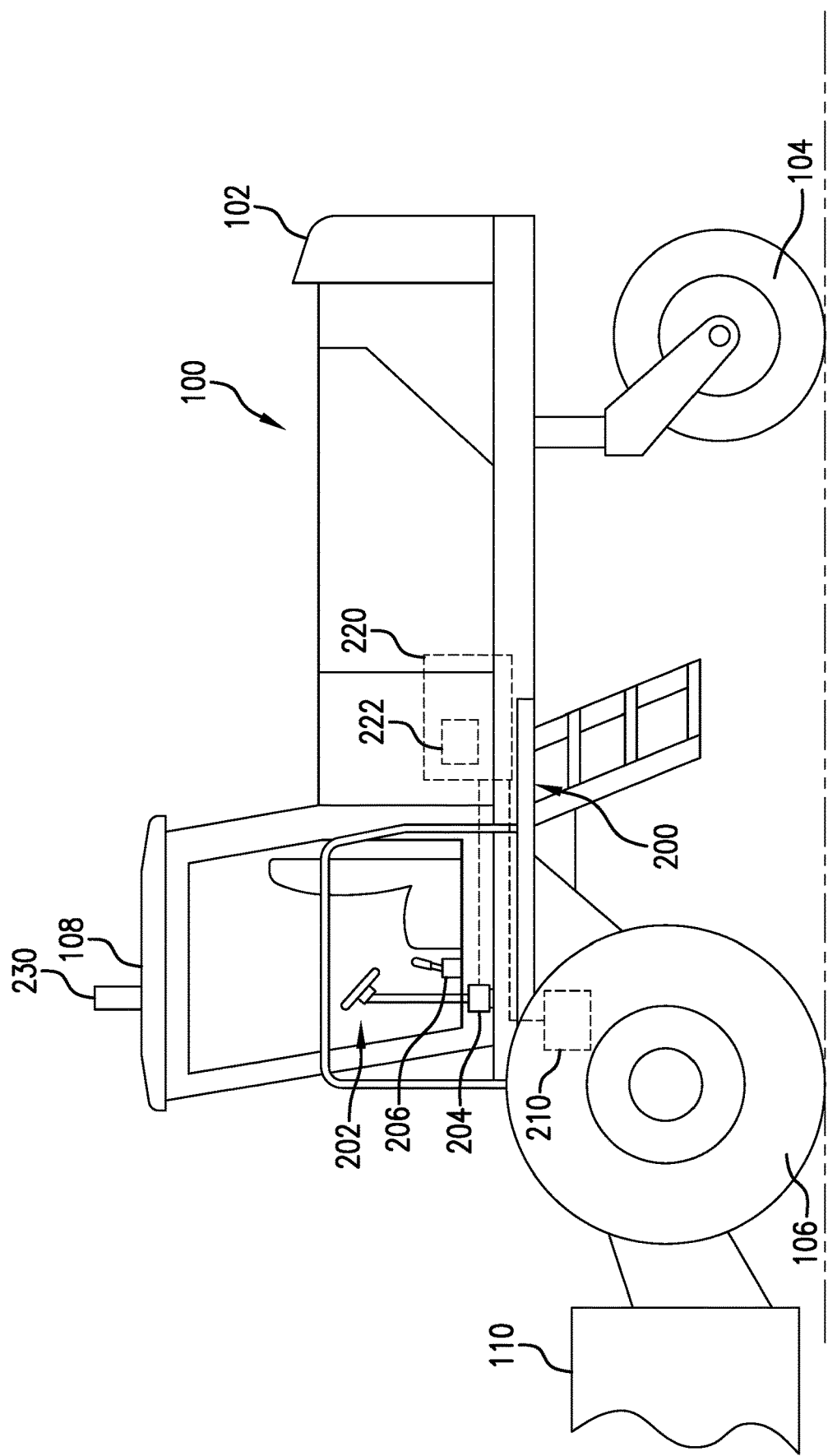
FIG. 1 illustrates a side view of an exemplary embodiment of a vehicle, illustrated in the form of an agricultural vehicle, including a steering system, provided in accordance with the present disclosure.
Figure 2:
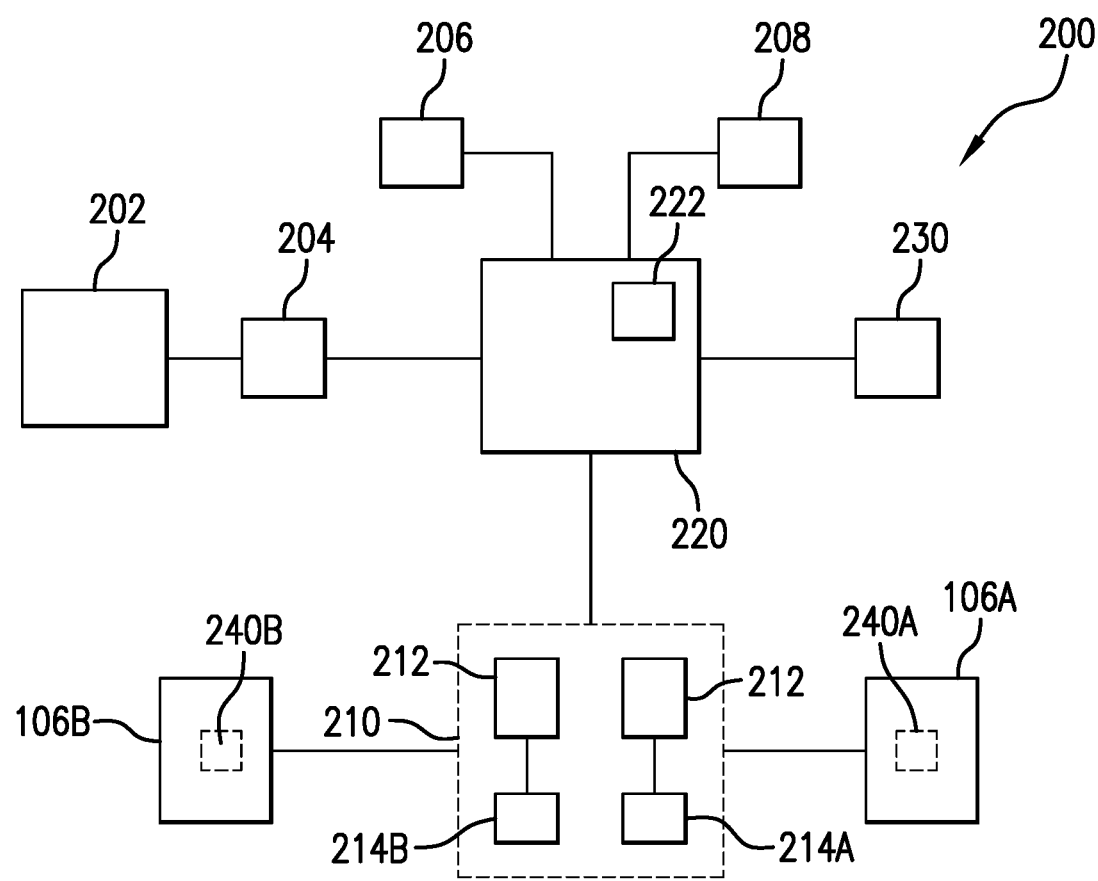
FIG. 2 illustrates a block diagram of the steering system of FIG. 1.

Referring now to the drawings, and more particularly to FIGS. 1-2, there is shown a vehicle 100, which is illustrated in the form of an agricultural vehicle commonly known as a self-propelled windrower 100. However, the vehicle 100 may be in the form of any desired vehicle, agricultural or otherwise. Such vehicles include, but are not limited to, other windrowers or swathers, mowers, dozers, etc. The windrower 100 generally includes a chassis 102, rear and front wheels 104, 106, a prime mover (not shown), a cab 108, and a header 110 removably connected to the chassis 102. The prime mover may drive the front wheels 106, which may be steerable wheels. The rear wheels 104 may be configured as steerable, follower or caster wheels 104. At least two of the wheels 104, 106 are steerable. One of the steerable wheels, such as one of the front wheels 106A, may be referred to as a "first steerable wheel" while an opposite steerable wheel, such as the other front wheel 106B opposite the first steerable wheel, may be referred to as a "second steerable wheel." As used herein, the term "opposite" is with respect to a centerline of the vehicle 100 defining a travel direction of the vehicle 100. For example, one of the steerable wheels may be the front wheel 106A on the right side of the centerline while the "opposite" steerable wheel is the rear wheel 104 or the front wheel 106B on the left side of the centerline. The header 110 may generally include a cutting mechanism, such as a sickle bar or rotary cutter, and a conveyor or feeder mechanism. The header 110 can be in the form of any desired header.

The windrower 100 also includes a steering system 200 for rotating and steering the steerable wheels, e.g., the front wheels 106. The steering system 200 allows the agricultural vehicle 100 to be a differential steer machine, i.e., a dual path steering machine, as will be described further herein. The steering system 200 includes an actuating device 210 including a first driver 214A configured to rotate one of the steerable wheels 106A at variable rotation speeds and a second driver 214B for configured to rotate the other steerable wheel 106B at variable rotation speeds, as will be described further herein, and a controller 220 operably coupled to the first driver 214A and the second driver 214B. The steering system 200 may optionally include a global positioning satellite (GPS) system 230 that is operably coupled to the controller 220 and configured to output a position signal to the controller 220 corresponding to a current position of the vehicle 100. The GPS system 230 may be placed on top of the cab 108 in line with the centerline of the vehicle 100, as is known.

The steering system 200 may be configured as a semi-autonomous steer-by-wire system 200, in which embodiments the steering system 200 may also include a steering wheel 202, a steering wheel sensor 204 operably coupled to the controller 220 for electronically transmuting the movement of the steering wheel 202 to control the actuating device 210 and thereby steer the wheels 106, a drive selector 206, and a parking brake 208. Hence, in such embodiments the steering system 200 does not have a physical mechanical and/or hydraulic connection between the steering wheel 202, the drive selector 206, and the actuating device 220. It should be appreciated that while the steering system 200 is illustrated and described as a semi-autonomous steer-by-wire system, such a configuration is exemplary only. For example, the steering system 200 may be configured as a fully autonomous steering system that has no need for input from a user seated in the cab 108 and thus foregoes the steering wheel 202, the steering wheel sensor 204, the drive selector 206, and/or the parking brake 208 entirely.

The actuating device 210 is operably connected to the wheels 106 for moving, e.g. steering and/or propelling, the wheels 106. The actuating device 210 may include a pair of hydraulic pumps 212 and drivers 214A, 214B, which may each be a hydraulic motor supplied with hydraulic fluid by the hydraulic pumps 212, which are respectively associated with a respective wheel 106A, 106B for steering each wheel 106A, 106B. The hydraulic pumps 212 and motors 214A, 214B may be coupled to each other, the prime mover, and the wheels 106A, 106B in a known configuration. The actuating device 210 may further include various electrical and/or fluid lines, valves, accumulators, actuators, arms, swashplates, and/or driveshafts. The actuating device 210 may be in the form of any desired electric and/or hydraulic actuating device or assembly. It is conceivable that the actuating device 210 is operably connected to the front and rear wheels 104, 106 for steering and/or propelling the wheels 104, 106.

In known semi-autonomous and autonomous vehicles, the controller generally controls the steering mechanism to direct the vehicle based off of position signals received by a GPS system. While such arrangements are generally effective, there are instances where improvements can be made. One such instance is when the vehicle, such as a windrower, is configured to make differential turns, i.e., turns where the opposite steerable wheels rotate at different rotational speeds, and making a turn at the end of a row of crops into headlands. Due to the differential turn essentially being the vehicle turning about the wheels with little positional movement, there is little movement of the GPS system to register the vehicle as moving. Thus, the controller does not have proper positioning information about the vehicle. Further, the GPS system is unable to accurately register that the heading of the vehicle has changed, which makes the information that the controller utilizes to control steering of the vehicle even less accurate.

Figure 3:
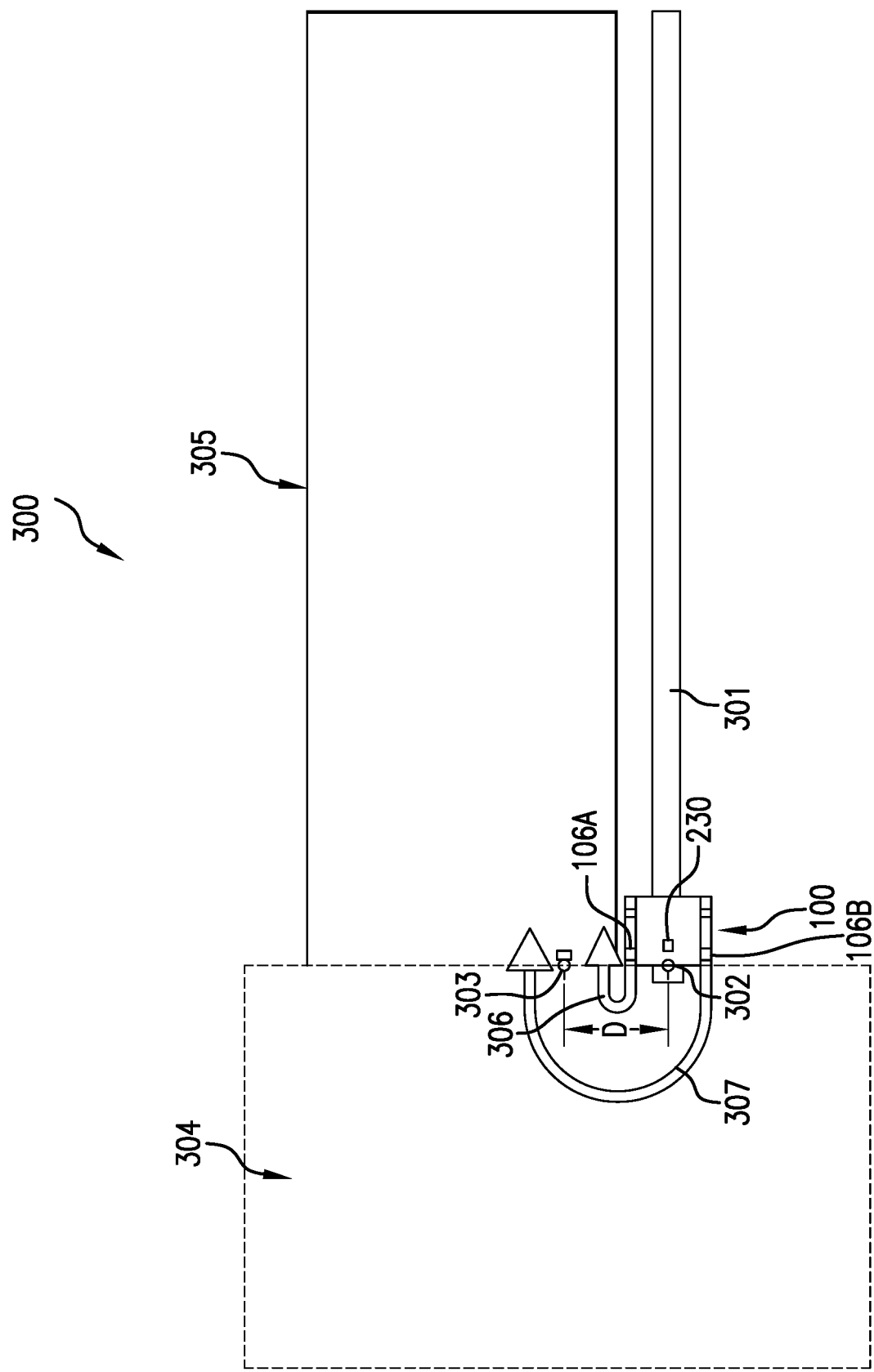
FIG. 3 illustrates how the steering system of FIGS. 1-2 navigates the vehicle through a turn.

To address some of the previously described issues with known vehicles, and referring now to FIG. 3 as well, the controller 220 is configured to: enter a turn mode; determine a first rotation speed of the at least one first steerable wheel 106A and a second rotation speed of the at least one second steerable wheel 106B to turn the vehicle 100 and reach a defined second position 303 from a first position 302, the second rotation speed being different than the first rotation speed; output a first rotation speed signal to the first driver 214A to rotate the at least one first steerable wheel 106A at the first rotation speed and a second rotation speed signal to the second driver 214B to rotate the at least one second steerable wheel 106B at the second rotation speed in the turn mode; and determine the vehicle 100 has reached the defined second position 303 based at least partially on the first rotation speed and the second rotation speed and responsively exit the turn mode. As used herein, "exit the turn mode" refers to the controller 220 not outputting further different rotation speed signals to the drivers 214A, 214B to turn the vehicle 100 towards the defined second position 303, which has already been reached. The vehicle 100 may exit the turn mode and enter a travel mode. In the travel mode, the vehicle 100 may travel generally straight as illustrated by straight path 301, may travel with slight turns that are not differential turns, and/or may be manually controlled by an operator utilizing the steering wheel 202. In some embodiments, the controller 220 is configured to lockout signals from the steering wheel sensor 204 while in the turn mode to reduce the likelihood of an operator inadvertently turning the vehicle 100 while turning to the defined second position 303 from the first position 302. In some embodiments, the controller 220 is configured to enter the turn mode upon receiving a turn mode initiation signal, e.g., from the steering wheel sensor 204 upon a user activating a button on the steering wheel 202. Upon entering the turn mode, the controller 220 may determine the first position 302 of the vehicle 100 based on a received position signal and determine the first rotation speed and the second rotation speed to turn the vehicle 100 to the defined second position 303 based on the received position signal corresponding to the first position 302. It should thus be appreciated that the controller 220 can be configured to enter the turn mode after being signaled to do so by a user.

In some embodiments, the first position 302 is a defined first position. The controller 220 may be configured to determine the vehicle 100 has reached the defined first position 302 based on a received position signal from the GPS system 230 to enter the turn mode. In this respect, the controller 220 can utilize received position signals from the GPS system 230 to determine when the vehicle 100 has reached the defined first position 302, which may be the end of a row of uncut crops, cause the drivers 214A, 214B to rotate their respective steerable wheels 106A, 106B at different rotation speeds and perform a differential turn to the defined second position 303, which may be the beginning of another row of uncut crops, and determine that the vehicle 100 has reached the defined second position 303 based on the difference between the first rotation speed and the second rotation speed without needing to utilize positioning signals from the GPS system 230. The controller 220 can determine the turn path of the vehicle 100 based on the difference in the respective rotation speed of the steerable wheels 106A, 106B, along with a travel speed of the vehicle 100 during the turn and/or other parameters such as known turn radius relationships to rotational speed differences, to determine that the vehicle 100 has reached the defined second position 303, at which point the controller 220 can exit the turn mode and, if desired, re-enter the travel mode and utilize position signals from the GPS system 230 to determine the position of the vehicle 100. In some embodiments, the rotation speeds of the steerable wheels 106A, 106B also control the travel speed of the vehicle 100, i.e., the steerable wheels 106A, 106B also propel the vehicle 100, so the rotation speeds of the steerable wheels 106A, 106B may control both the turn direction and travel speed of the vehicle 100 and the controller 220 can determine the vehicle 100 has reached the defined second position 303 based solely on the rotation speeds of the steerable wheels 106A, 106B.

In some embodiments, the controller 220 includes a memory 222 that is configured to store a map 300 therein, which may be a field map as illustrated in FIG. 3. The defined first position 302 and the defined second position 303 may be defined in the map 300, with the controller 200 being configured to determine the first rotation speed and the second rotation speed based at least partially on a distance D between the defined first position 302 and the defined second position 303 in the map 300. It should be appreciated that the controller 220 may be configured to determine the first rotation speed and/or the second rotation speed in the travel mode, i.e., before the vehicle 100 reaches the defined first position 302, or in the turn mode. A boundary region 304 may be defined in the map 300, with the controller 220 being configured to determine the first rotation speed and the second rotation speed so the vehicle 100 turns entirely within the boundary region 304 to reach the defined second position 303 from the defined first position 302. In some embodiments, such as when the vehicle 100 is an agricultural vehicle, the boundary region 304 may be headlands that are located adjacent to an area of uncut crops 305. The boundary region 304 may be defined in the map 300 by a user, either using the controller 220 and/or by uploading the map 300 into the memory 222 with the boundary region 304 previously defined. By limiting the turn of the vehicle 100 in the boundary region 304 while in the turn mode, the controller 220 can increase how much cut crop stays together in a formed windrow while also reducing the amount of soil compaction that the vehicle 100 causes during the turn.

In some embodiments, the steering system 200 includes a first wheel movement sensor 240A associated with the at least one first steerable wheel 106A and a second wheel movement sensor 240B associated with the at least one second steerable wheel 106B. The first wheel movement sensor 240A is configured to output first wheel movement signals corresponding to a first wheel movement of the at least one first steerable wheel 106A and the second wheel movement sensor 240B is configured to output second wheel movement signals corresponding to a second wheel movement of the at least one second steerable wheel 106B. The controller 220 is operably coupled to the first wheel movement sensor 240A and the second wheel movement sensor 240B, allowing the controller 220 to receive the respective wheel movement signals. As used herein, "wheel movement" can include both position changes of the steerable wheels 106A, 106B, i.e., distance traveled by the steerable wheels 106A, 106B, as well as orientation changes of the steerable wheels 106A, 106B, i.e., turn angle changes of the steerable wheels 106A, 106B. It should be appreciated that the wheel movement described herein may refer to both instantaneous wheel movement, i.e., a momentary change, as well as wheel movement during a defined time period, e.g., while the controller 220 is in the turn mode.

In some embodiments, the controller 220 is configured to determine the vehicle 100 has reached the defined second position 303 from the first position 302 based on received first wheel movement signals and received second wheel movement signals, e.g., by defining a first travel path 306 that the at least one first steerable wheel 106A follows so the vehicle 100 reaches the defined second position 303 from the first position 302 and a second travel path 307 that the at least one second steerable wheel 106B follows so the vehicle 100 reaches the defined second position 303 from the first position 302. As illustrated in FIG. 3, the first travel path 306 may be an inner wheel travel path, since the first steerable wheel 106A is on the side of the turn, while the second travel path 307 may be an outer wheel travel path, since the second steerable wheel 106B is on the opposite side of the turn and the first steerable wheel 106A. It should be appreciated that when the vehicle 100 turns in the opposite direction, the second travel path of the second steerable wheel 106B would be the inner wheel travel path and the first travel path of the first steerable wheel 106A would be the outer travel path. To define the travel paths 306, 307, the controller 220 may be configured to determine the distance D between the defined positions 302, 303 and then calculate a shortest turn distance between the first position 302 and the defined second position 303, taking into account various parameters such as a minimum turn radius of the vehicle 100 as well as any additional conditions, e.g., the defined travel paths having to remain within the boundary region 304.

The controller 220 can determine the distances and turn angles of each of the steerable wheels 106A, 106B based on received wheel movement signals from the wheel movement sensors 240A, 240B to determine that each of the steerable wheels 106A, 106B has followed its respective travel path 306, 307 so the vehicle 100 reaches the defined second position 303. In some embodiments, the controller 220 is further configured to determine the first wheel movement of the at least one first steerable wheel 106A deviates from the defined first travel path 306 to the defined second position 303 from the first position 302 and responsively outputs a first speed adjustment signal to the first driver 214A to adjust the rotation speed of the at least one first steerable wheel 106A and/or determine the second wheel movement of the at least one second steerable wheel 106B deviates from the defined second travel path 307 to the defined second position 303 from the first position 302 and responsively output a second speed adjustment signal to the second driver 214B to adjust the rotation speed of the at least one second steerable wheel 106B. By determining deviations of one or both of the steerable wheels 106A, 106B, the controller 220 can output corrective speed adjustment signals to the appropriate driver 214A, 214B and change the travel speed and/or turn angle of the appropriate steerable wheel 106A, 106B. Due to the controller 220 determining that the vehicle 100 has reached the defined second position 303 based at least partially on the rotation speeds of the steerable wheels 106A, 106B, in some embodiments the controller 220 is configured to not consider received position signals from the GPS system 230, which may be inaccurate when making a differential turn, when determining the vehicle 100 has reached the defined second position 303.

In some embodiments, the controller 220 is configured to determine a current heading of the vehicle 100 based on a heading of the vehicle 100 at the first position 302, received first wheel movement signals, and received second wheel movement signals. For example, as illustrated in FIG. 3, the controller 220 may utilize position signals from the GPS system 230 in the travel mode as the vehicle 100 travels along the travel path 301. The position signals from the GPS system 230 are generally accurate as the vehicle 100 travels along the travel path 301 because there is constant positional change, allowing the controller 220 to determine the current heading based on multiple known positions of the vehicle 100 determined from the received position signals. When the controller 220 enters the turn mode to turn from the first position 302 to the defined second position 303, the controller 220 may determine the current heading at any time during the turn, or shortly thereafter, by defining the travel paths 306, 307, which should define the turn of the vehicle 100, and calculating where the steerable wheels 106A, 106B are in the respective travel paths 306, 307 based on the respective rotation speeds. Thus, the controller 220 may be configured to know the heading of the vehicle 100 at all times by utilizing position signals from the GPS system 230 when the controller 220 is in the travel mode, when the GPS positioning signals are most accurate, and based at least partially off of the rotation speeds of the steerable wheels 106A, 106B when in the turn mode, when there is relatively little positional movement of the vehicle 100 and the GPS positioning signals are less accurate.

Figure 4:
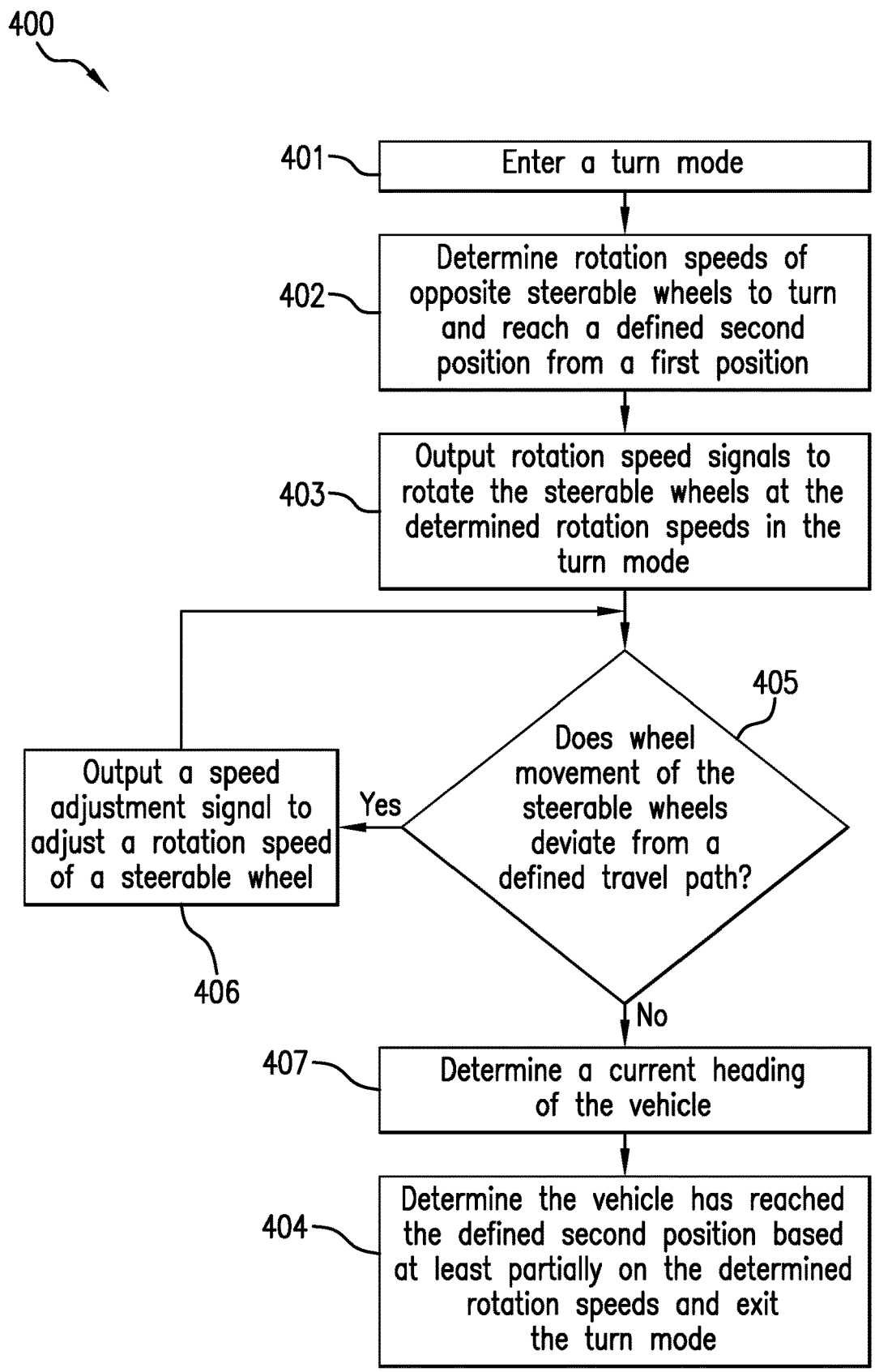
FIG. 4 is a flow chart illustrating an exemplary embodiment of a method for steering a vehicle, provided in accordance with the present disclosure.

Referring now to FIG. 4, the present disclosure also provides a method 400 for steering a vehicle, such as the previously described vehicle 100. The method 400 is performed by the controller 220 and includes: entering 401 a turn mode; determining 402 a first rotation speed of the first steerable wheel(s) 106A and a second rotation speed of the second steerable wheel(s) 106B to turn the vehicle 100 and reach the defined second position 303 from the first position 302, with the rotation speeds being different; outputting 403 the first rotation speed signal to the first driver 214A to rotate the first steerable wheel(s) 106A at the first rotation speed and the second rotation speed signal to the second driver 214B to rotate the second steerable wheel(s) 106B at the second rotation speed in the turn mode; and determining 404 the vehicle 100 has reached the defined second position 303 based at least partially on the first rotation speed and the second rotation speed and responsively exiting the turn mode. Determining 402 the first rotation speed and the second rotation speed may be based at least partially on the distance D between the first position 302, which may be a defined first position, and the defined second position 303 in the map 300, such as the field map 300 of FIG. 3. Determining 402 the first rotation speed and the second rotation speed may also be done such that the vehicle 100 turns entirely within the boundary region 304 to reach the defined second position 303 from the defined first position 302. Determining 404 the vehicle 100 has reached the defined second position 303 may be based on received first wheel movement signals and received second wheel movement signals from the respective wheel movement sensors 240A, 240B, as previously described. Determining 404 the vehicle 100 has reached the defined second position 303 may be performed without considering position signals from the GPS system 430, as previously described.

The method 400 may further include determining 405 the first wheel movement of the first steerable wheel(s) 106A deviates from the defined first travel path 306 and/or the second wheel movement of the second steerable wheel(s) 106B deviates from the defined second travel path 307 and responsively outputting 406 a respective speed adjustment signal to adjust the respective rotation speed of the steerable wheel(s) 106A, 106B. The method 400 may also include determining 407 the current heading of the vehicle 100 based on the heading of the vehicle 100 at the first position 302, the received first wheel movement signals, and the received second wheel movement signals.

From the foregoing, it should be appreciated that the present disclosure provides a steering system 200 and associated method 400 that allow accurate differential turning of the vehicle 100 without having to rely on GPS positioning signals, which may be inaccurate during the tight turn. Once the turn is completed and the vehicle 100 will be traveling in a path with detectable positional changes again, the GPS positioning signals, which are generally accurate during such positional changes, can once again be utilized to guide and/or control steering of the vehicle 100. Therefore, the present disclosure provides a steering system 200 and associated method 400 that allow autonomous or semi-autonomous control of the steering of the vehicle 100 that is accurate and less prone to issues presented by taking tight turns while relying solely on GPS positioning signals.

It is to be understood that the steps of the method 400 are performed by the controller 220 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 220 described herein, such as the method 400, is implemented in software code or instructions which are tangibly stored on a tangible computer readable medium, such as the memory 222. The controller 220 loads the software code or instructions via a direct interface with the computer readable medium or via a wired and/or wireless network. Upon loading and executing such software code or instructions by the controller 220, the controller 220 may perform any of the functionality of the controller 220 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present disclosure will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A steering system for a vehicle, the steering system comprising:
   at least one first steerable wheel;
   a first driver coupled to the at least one first steerable wheel and configured to drive the at least one first steerable wheel at variable rotation speeds;
   at least one second steerable wheel opposite the at least one first steerable wheel;
   a second driver coupled to the at least one second steerable wheel and configured to drive the at least one second steerable wheel at variable rotation speeds; and
   a controller operably coupled to the first driver and the second driver and configured to:
      enter a turn mode;
      determine a first rotation speed of the at least one first steerable wheel and a second rotation speed of the at least one second steerable wheel to turn the vehicle and reach a defined second position from a first position, the second rotation speed being different than the first rotation speed;
      output a first rotation speed signal to the first driver to rotate the at least one first steerable wheel at the first rotation speed and a second rotation speed signal to the second driver to rotate the at least one second steerable wheel at the second rotation speed in the turn mode; and
      determine the vehicle has reached the defined second position based at least partially on the first rotation speed and the second rotation speed and responsively exit the turn mode.

2. The steering system of claim 1, further comprising a global positioning satellite system (GPS) operably coupled to the controller and configured to output a position signal corresponding to a position of the vehicle, the controller being configured to determine the vehicle has reached a defined first position based on a received position signal to enter the turn mode.

3. The steering system of claim 2, wherein the controller comprises a memory configured to store a map therein, the defined first position and the defined second position being defined in the map, the controller being configured to determine the first rotation speed and the second rotation speed based at least partially on a distance between the defined first position and the defined second position in the map.

4. The steering system of claim 3, wherein a boundary region is defined in the map, the controller being configured to determine the first rotation speed and the second rotation speed so the vehicle turns entirely within the boundary region to reach the defined second position from the defined first position.

5. The steering system of claim 2, wherein the controller is configured to not consider received position signals from the GPS system when determining the vehicle has reached the defined second position.

6. The steering system of claim 1, further comprising a first wheel movement sensor associated with the at least one first steerable wheel and a second wheel movement sensor associated with the at least one second steerable wheel, the first wheel movement sensor being configured to output first wheel movement signals corresponding to a first wheel movement of the at least one first steerable wheel and the second wheel movement sensor being configured to output second wheel movement signals corresponding to a second wheel movement of the at least one second steerable wheel, the controller being operably coupled to the first wheel movement sensor and the second wheel movement sensor.

7. The steering system of claim 6, wherein the controller is configured to determine the vehicle has reached the defined second position based on received first wheel movement signals and received second wheel movement signals.

8. The steering system of claim 6, wherein the controller is further configured to at least one of:
determine the first wheel movement of the at least one first steerable wheel deviates from a defined first travel path to the defined second position from the first position and responsively output a first speed adjustment signal to the first driver to adjust the rotation speed of the at least one first steerable wheel; or
determine the second wheel movement of the at least one second steerable wheel deviates from a defined second travel path to the defined second position from the first position and responsively output a second speed adjustment signal to the second driver to adjust the rotation speed of the at least one second steerable wheel.

9. The steering system of claim 6, wherein the controller is configured to determine a current heading of the vehicle based on a heading of the vehicle at the first position, received first wheel movement signals, and received second wheel movement signals.

10. An agricultural vehicle, comprising:
a chassis;
a header carried by the chassis and comprising a cutting mechanism; and
a steering system carried by the chassis, the steering system comprising:
at least one first steerable wheel;
a first driver coupled to the at least one first steerable wheel and configured to drive the at least one first steerable wheel at variable rotation speeds;
at least one second steerable wheel opposite the at least one first steerable wheel;
a second driver coupled to the at least one second steerable wheel and configured to drive the at least one second steerable wheel at variable rotation speeds; and
a controller operably coupled to the first driver and the second driver and configured to:
enter a turn mode;
determine a first rotation speed of the at least one first steerable wheel and a second rotation speed of the at least one second steerable wheel to turn the agricultural vehicle and reach a defined second position from a first position, the second rotation speed being different than the first rotation speed;
output a first rotation speed signal to the first driver to rotate the at least one first steerable wheel at the first rotation speed and a second rotation speed signal to the second driver to rotate the at least one second steerable wheel at the second rotation speed in the turn mode; and
determine the agricultural vehicle has reached the defined second position based at least partially on the first rotation speed and the second rotation speed and responsively exit the turn mode.

11. The agricultural vehicle of claim 10, further comprising a global positioning satellite system (GPS) operably coupled to the controller and configured to output a position signal corresponding to a position of the vehicle, the controller being configured to determine the vehicle has reached a defined first position based on a received position signal to enter the turn mode.

12. The agricultural vehicle of claim 11, wherein the controller comprises a memory configured to store a map therein, the defined first position and the defined second position being defined in the map, the controller being configured to determine the first rotation speed and the second rotation speed based at least partially on a distance between the defined first position and the defined second position in the map.

13. The agricultural vehicle of claim 12, wherein a boundary region is defined in the map, the controller being configured to determine the first rotation speed and the second rotation speed so the agricultural vehicle turns entirely within the boundary region to reach the defined second position from the defined first position.

14. The agricultural vehicle of claim 13, wherein the map is a field map and the boundary region is a headlands of the field map.

15. The agricultural vehicle of claim 11, wherein the controller is configured to not consider received position signals from the GPS system when determining the vehicle has reached the defined second position.

16. The agricultural vehicle of claim 10, further comprising a first wheel movement sensor associated with the at least one first steerable wheel and a second wheel movement sensor associated with the at least one second steerable wheel, the first wheel movement sensor being configured to output first wheel movement signals corresponding to a first wheel movement of the at least one first steerable wheel and the second wheel movement sensor being configured to output second wheel movement signals corresponding to a second wheel movement of the at least one second steerable wheel, the controller being operably coupled to the first wheel movement sensor and the second wheel movement sensor.

17. The agricultural vehicle of claim 16, wherein the controller is configured to determine the agricultural vehicle has reached the defined second position based on received first wheel movement signals and received second wheel movement signals.

18. The agricultural vehicle of claim 16, wherein the controller is further configured to at least one of:
determine the first wheel movement of the at least one first steerable wheel deviates from a defined first travel path to the defined second position from the first position and responsively output a first speed adjustment signal to the first driver to adjust the rotation speed of the at least one first steerable wheel; or
determine the second wheel movement of the at least one second steerable wheel deviates from a defined second travel path to the defined second position from the first position and responsively output a second speed adjustment signal to the second driver to adjust the rotation speed of the at least one second steerable wheel.

19. The agricultural vehicle of claim 16, wherein the controller is configured to determine a current heading of the agricultural vehicle based on a heading of the agricultural vehicle at the first position, received first wheel movement signals, and received second wheel movement signals.

20. A method for steering a vehicle, the vehicle comprising at least one first steerable wheel, a first driver coupled to the at least one first steerable wheel, at least one second steerable wheel opposite the at least one first steerable wheel, a second driver coupled to the at least one second steerable wheel, and a controller coupled to the first driver and the second driver, the method being performed by the controller and comprising:
entering a turn mode;
determining a first rotation speed of the at least one first steerable wheel and a second rotation speed of the at least one second steerable wheel to turn the vehicle and reach a defined second position from a first position, the second rotation speed being different than the first rotation speed;

outputting a first rotation speed signal to the first driver to rotate the at least one first steerable wheel at the first rotation speed and a second rotation speed signal to the second driver to rotate the at least one second steerable wheel at the second rotation speed in the turn mode; and determining the vehicle has reached the defined second position based at least partially on the first rotation speed and the second rotation speed and responsively exiting the turn mode.

* * * * *